3,364,225
O - ALKENYL- AND O - ARYL - N - PYRIDYL URETHANES AND PROCESS FOR THEIR PRODUCTION
Godfrey Wilbert, Carmel, and Seymour Hyden, Spring Valley, N.Y., assignors to Nepera Chemical Co., Inc.
No Drawing. Filed Nov. 27, 1964, Ser. No. 414,422
6 Claims. (Cl. 260—295)

ABSTRACT OF THE DISCLOSURE

A novel class of urethanes derivatives, which may be represented by the formula:

[pyridine]–(NH–C(=O)–OR)$_n$, or [pyridine]–(CH$_2$NH–C(=O)–OR)$_n$ wherein R is lower alkenyl and $n$ is 1 or 2. These compounds are useful as monomers in certain polymerization reactions.

---

This invention relates to a composition of matter and relates more particularly to compounds of the formula:

[benzene ring with R$_1$, R$_2$, (R)$_n$]

and

[ring with R$_1$, R$_2$, S, N–R$_3$]

wherein R represents $$-NH-\overset{O}{\underset{\|}{C}}-OR_4;\quad -(CH_2)_n NH-\overset{O}{\underset{\|}{C}}-OR_4$$

or $$-NH-\overset{O}{\underset{\|}{C}}-O-[\text{phenyl with }R_1, R_2]$$

and R$_3$ represents $$-NH-\overset{O}{\underset{\|}{C}}-OR_4 \quad\text{or}\quad -NH-\overset{O}{\underset{\|}{C}}-O-[\text{phenyl with }R_1, R_2]$$

in which R$_4$ represents lower alkenyl such as allyl and R$_1$ and R$_2$ each represent hydrogen, lower alkyl of 1 to 6 carbon atoms, halogen, nitro, thioalkyl, heterocyclic such as pyridyl, aryl such as phenyl or substituted aryl such as phenethyl and $n$ is from 1 to 2.

This invention relates to a novel method for the production of the above compounds.

The compounds of this invention are useful as copolymerizable monomers in polymerization reactions with other monomeric compounds. They are also useful as agricultural chemicals such as weed killers, fungus inhibitors and plant growth regulators.

According to the process of this invention, these compounds are prepared by reacting aminopyridines or piperidines of the formula:

[ring with R$_1$, R$_2$, S, N–H]   [pyridine with R$_1$, R$_2$, (NH$_2$)$_n$]

or

[pyridine with (CH$_2$NH$_2$)$_n$]

with a compound of the formula:

$$R_4-O-\overset{O}{\underset{\|}{C}}-Cl$$

or

[phenyl with R$_1$, R$_2$]$-O-\overset{O}{\underset{\|}{C}}-Cl$ in which the several substituents are as defined.

This reaction is preferably effected at a temperature of about −10° C. to 10° C. in a solvent system consisting of pyridine. The desired reaction product may be recovered from the reaction mixture by dilution with ice-water followed by filtration or extraction with a solvent such as ether. The crude product may be purified using distillation or crystallization techniques.

In order to further illustrate the practice of this invention, the following examples are given:

EXAMPLE 1

O-allyl-N-3-pyridylcarbamate

[3-pyridyl]–NH–C(=O)–OCH$_2$CH=CH$_2$ 15 g. of 3-aminopyridine are dissolved in 30 ml. pyridine and cooled to about −10° C. 24 g. of allyl chloroformate are added over ½-hour period, dropwise, with stirring at a temperature of −10 to 10° C. The reaction mixture is allowed to warm to room temperature (20 to 30° C.), stirred for one hour and then added to 300 ml. of ice water to yield an insoluble oil. The mixture is extracted with ether and the ethereal layer dried. The either is removed by distillation to yield a pale yellow solid residue. The product is recrystallized from benzene-hexane to give O-allyl-N-3-pyridylcarbamate as a white solid, M.P. 100 to 102° C. The infra-red spectrum of this compound features a band at 1725 cm.$^{-1}$. (C=O).

Percent N, calcd.: 15.72. Found: 16.00.

EXAMPLE 2

O-allyl-N-2-pyridylcarbamate

[2-pyridyl]–NH–C(=O)–OCH$_2$CH=CH$_2$ 15 g. of 2-aminopyridine are dissolved in 30 ml. pyridine and cooled to about −10° C. 24 g. of allyl chloroformate are added over ½-hour period, dropwise, with stirring at a temperature of −10 to 10° C. The reaction mixture is allowed to warm to room temperature (20 to 30° C.), stirred for one hour and then added to 300 ml. of ice water to yield a solid product. O-allyl-N-2-pyridylcarbamate is obtained, after recrystallization from benzene-hexane, as a while solid, M.P.=73.5–75° C. The infra-red spectrum of this compound features a band at 1725 cm$^{-1}$. (C=O.)

Percent N, calcd.: 15.72. Found: 16.10.

EXAMPLE 3

O-allyl-N-piperidylcarbamate

[piperidine S N]–C(=O)–OCH$_2$CH=CH$_2$ 15 g. of piperidine are dissolved in 20 ml. pyridine and cooled to about −10° C. 27 g. of allyl chloroformate are added over ½-hour, dropwise, with stirring at a temperature of −10 to 10° C. The reaction mixture is allowed to warm to room temperature (20 to 30° C.), stirred for one hour and then added to 300 ml. of ice water to yield an insoluble oil. The mixture is extracted with ether and the etheral layer dried. The ether is removed by distillation and the product obtained by distillation at 75–77° C. 2–3 mm.; $n_D^{22}$=1.4720. The infra-red spectrum of this compound features a band at 1670 cm.$^{-1}$. (C=O.)

EXAMPLE 4

O-allyl-N-3-pyridylmethylcarbamate

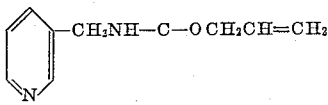

This compound is prepared by the method of Example 3 from 13 g. 3-aminomethylpyridine and 19 g. allyl chloroformate. The carbamate is obtained by distillation at 180–185° C./4 mm.; $n_D^{21}$=1.5254. The infra-red spectrum features a band at 1705 cm$^{-1}$. (C=O.)

EXAMPLE 5

O-phenyl-N-2-pyridylcarbamate

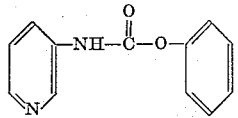

10 g. of 2-aminopyridine is dissolved in 35 ml. of pyridine and cooled to −10° C. 19 g. of phenyl chloroformate is added over ½-hour, dropwise, with stirring at a temperature of −10° to 10° C. The reaction mixture is allowed to warm to room temperature (20–30° C.), stirred for 1 hour and added to 300 ml. of ice water. The product precipitates in the form of a cream-white solid which after recrystallization from benzene-hexane affords O-phenyl-N-2-pyridyl-carbamate as a white solid, M.P. 160–162° C. The infra-red spectrum features a band at 1725 cm$^{-1}$.

Percent N, calcd.: 13.08. Found: 13.09.

EXAMPLE 6

O,O′-diallyl-N,N′-2,6-pyridyldicarbamate

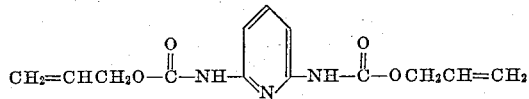

10 g. of 2,6-diaminopyridine is dissolved in 35 ml. pyridine and cooled to −10° C. 29 g. of allyl chloroformate is added over ½-hour, dropwise, with stirring at a temperature of −10 to 10° C. The reaction mixture is allowed to warm to room temperature (20–30° C.), stirred for one hour and then added to 300 ml. of ice water to yield an insoluble oil. The crude product is dissolved in isopropyl alcohol, treated with charcoal and precipitated by addition of water. The carbamate is obtained, after recrystallization from benzene-hexane as a cream-white solid, M.P.=106–110° C. The infra-red spectrum features a band at 1730 cm.$^{-1}$. (C=O.)

EXAMPLE 7

O,O′-diphenyl-N,N′-2,6-pyridyldicarbamate

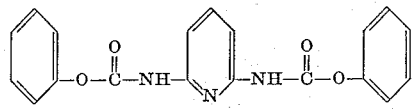

This compound is prepared by the method of Example 6 from 10 g. 2,6-diaminopyridine and 38 g. phenyl chloroformate. The product is obtained, after recrystallization from isopropyl alcohol-hexane as a straw-colored solid, M.P.=187–190° C. The infra-red spectrum features a band at 1740 cm.$^{-1}$. (C=O.)

It is to be understood that the foregoing detailed description is given merely by way of illustration and that many variations may be made therein without departing from the spirit of our invention.

Having described our invention, what we desire to secure by Letters Patent is:

1. A member selected from a group consisting of compounds of the formula:

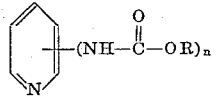

wherein R is lower alkenyl or phenyl and $n$ is 1 or 2 and the position para to the hetero nitrogen is unsubstituted.

2. O-allyl-N-3-pyridylcarbamate.
3. O-allyl-N-2-pyridylcarbamate.
4. O-phenyl-N-2-pyridylcarbamate.
5. O,O′-diallyl-N,N′-2,6-pyridyldicarbamate.
6. O,O′-diphenyl-N,N′-2,6-pyridyldicarbamate.

References Cited

UNITED STATES PATENTS

| | | | |
|---|---|---|---|
| 2,914,533 | 11/1959 | Clinton | 260—295 X |
| 3,284,460 | 11/1966 | Wilbert et al. | 260—294.8 |
| 3,284,461 | 11/1966 | Wilbert et al. | 260—295.5 X |

OTHER REFERENCES

Lowy et al., Introduction to Organic Chemistry, Wiley, pp. 213–215 (1945).

NORMA S. MILESTONE, *Acting Primary Examiner.*

A. L. ROTMAN, *Assistant Examiner.*